(12) United States Patent
Tamaki et al.

(10) Patent No.: US 7,385,680 B2
(45) Date of Patent: Jun. 10, 2008

(54) CAMERA MODULE

(75) Inventors: Satoshi Tamaki, Osaka (JP);
Michiyoshi Nagashima, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/569,723

(22) PCT Filed: Apr. 11, 2005

(86) PCT No.: PCT/JP2005/007039

§ 371 (c)(1),
(2), (4) Date: Nov. 28, 2006

(87) PCT Pub. No.: WO2005/119175

PCT Pub. Date: Dec. 15, 2005

(65) Prior Publication Data

US 2007/0247611 A1    Oct. 25, 2007

(30) Foreign Application Priority Data

Jun. 3, 2004    (JP) .............................. 2004-165269

(51) Int. Cl.
*G01C 3/08*    (2006.01)
(52) U.S. Cl. ..................................... 356/4.01
(58) Field of Classification Search ...... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 5,410,346 A | 4/1995 | Saneyoshi et al. | |
| 6,350,976 B1* | 2/2002 | Higashino | 250/201.4 |
| 2003/0048493 A1* | 3/2003 | Pontifex et al. | 358/514 |
| 2003/0085991 A1 | 5/2003 | Toda | |
| 2003/0218675 A1* | 11/2003 | Nonoyama | 348/144 |

FOREIGN PATENT DOCUMENTS

| | | |
|---|---|---|
| JP | 5-265547 | 10/1993 |
| JP | 8-159754 | 6/1996 |
| JP | 10-255019 | 9/1998 |
| JP | 2001-016621 | 1/2001 |
| JP | 2001-174223 | 6/2001 |
| JP | 2002-366953 | 12/2002 |
| JP | 2003-083742 | 3/2003 |
| JP | 2004-012863 | 1/2004 |
| JP | 2004-132836 | 4/2004 |

* cited by examiner

*Primary Examiner*—Thomas H. Tarcza
*Assistant Examiner*—Luke D Ratcliffe
(74) *Attorney, Agent, or Firm*—Hamre, Schumann, Mueller & Larson, P.C.

(57) ABSTRACT

A plurality of lenses (1a-1d) of a lens module (1), a plurality of wavelength selection regions (2a-2d) each having at least one optical filter, and a plurality of imaging regions (4a-4d) are placed in one-to-one correspondence. At least two of the plurality of wavelength selection regions transmit light in at least one wavelength band among infrared light, red light, green light, and blue light. The distance to an object is calculated based on at least two pieces of image information outputted respectively from at least two imaging regions respectively corresponding to the at least two wavelength selection regions. Furthermore, a camera module outputs an image signal based on image information outputted from at least one of the plurality of imaging regions. This can realize a small and low-cost camera module capable of measuring the distance to an object and capturing the object.

12 Claims, 9 Drawing Sheets

CAMERA MODULE

TECHNICAL FIELD

The present invention relates to a small and slim camera module capable of measuring the distance to an object.

BACKGROUND ART

Conventionally, a stereo camera apparatus capable of being mounted on an automobile is known, which captures an object by a stereo camera equipped with two cameras, and arithmetically manipulates the obtained image information to calculate the distance to the object (see JP 5(1993)-265547 A). The distance calculation in the stereo camera apparatus is performed as follows. Using triangulation, which is one of the three-dimensional measurement techniques, a pixel block having a correlation with a pixel block in an image obtained by one camera is searched for and specified in an image obtained by the other camera. Then, the distance to an object is calculated based on the parallax between both the pixel blocks, i.e., the relative displacement amount of the respective pixel blocks in two images (stereo images).

However, in this stereo camera apparatus, a mechanical attachment error of two cameras exists. For example, the postures of the cameras may be displaced in a horizontal direction, a vertical direction, or a rotation direction. In particular, the displacement in the horizontal direction causes an error in the parallax obtained based on two images, and consequently, the distance calculated based on the parallax differs from a correct distance. Therefore, in order to obtain distance information with high reliability, a high attachment precision of a camera and complicated image processing for correcting an attachment error are required.

For example, JP 2003-83742 A discloses the following method so as to correct the attachment error in the horizontal direction of the stereo camera. In an image obtained by one camera, a plurality of approximated straight lines spatially parallel to each other, which extend in a distance direction, are specified, and a first vanishing point is calculated from an intersection of the approximated straight lines. Similarly, in an image obtained by the other camera, a plurality of approximated straight lines spatially parallel to each other, which extend in the distance direction, are specified, and a second vanishing point is calculated from an intersection of the approximated straight lines. Then, an error in a measurement distance ascribed to the attachment error in the horizontal direction is corrected based on the displacement amount between the first vanishing point and the second vanishing point.

A method for calculating a vanishing point will be described with reference to FIG. 15. For example, the case will be considered where a camera captures a pair of white lines 901, 902 in a broken line shape drawn on a road, as shown in FIG. 15. In this case, two approximated straight lines 901a, 902a parallel to each other, which extend in a distance direction, are specified using one edge of each of the white lines 901, 902. Then, an intersection 903 of the two approximated straight lines 901a, 902a is obtained as a vanishing point.

On the other hand, in order to enhance the recognition rate at night, an image processing method has been proposed, in which the recognition rate at night is enhanced by combining a visible light camera with an infrared camera, and subjecting each imaging information to image processing.

For example, JP10(1998)-255019 A discloses the following method. A visible light image obtained by a visible light camera is binarized, and a high-brightness portion such as a taillight of an automobile is recognized. The temperature information on a portion corresponding to the high-brightness portion is obtained from an infrared image obtained by an infrared camera, and a threshold value for binarization of the infrared image is determined based on the temperature information. Then, the infrared image is binarized using the threshold value for binarization, and a vehicle is recognized based on the binarized infrared image.

As described above, in the case of calculating a distance by a stereo camera, two visible light cameras are required, and furthermore, it is required to enhance the attachment precision of two cameras, or to perform complicated arithmetic processing for correcting the attachment error of two cameras. This causes problems such as the enlargement of an apparatus, the degradation in a layout property, and the increase in cost. Furthermore, even in the case of enhancing the recognition rate at night, two cameras, i.e., a visible light camera and an infrared camera are required, which causes problems such as the enlargement of an apparatus, the degradation in a layout property, and the increase in cost.

Furthermore, JP 2004-12863 A discloses a camera apparatus equipped with a distance-measuring optical system and an imaging optical system independently. The camera apparatus includes a camera module in which two lenses constituting a distance-measuring optical system and one lens constituting a photometric optical system are placed integrally on the same plane. Furthermore, the camera apparatus includes an imaging lens constituting an imaging optical system apart from the lens module. The movement amount of the imaging lens is calculated using two lenses for measuring a distance, whereby autofocusing is realized. In this camera apparatus, an object image is captured only by an imaging lens. Thus, optical systems are required independently for measuring a distance and capturing an image, which increases the number of components and assembly man-hour to increase cost, and enlarges an apparatus.

DISCLOSURE OF INVENTION

Problem to be Solved by the Invention

As described above, a small and low-cost camera apparatus capable of measuring the distance to an object and capturing the object has not been realized.

Means for Solving Problem

A camera module according to the present invention includes a lens module having a plurality of lenses arranged on the same plane; a plurality of wavelength selection regions each having at least one optical filter for selectively transmitting light in a particular wavelength band among light from an object; and a plurality of imaging regions having a plurality of pixels and outputting image information in accordance with incident light. The plurality of lenses, the plurality of wavelength selection regions, and the plurality of imaging regions are arranged in one-to-one correspondence.

At least two of the plurality of wavelength selection regions are first wavelength selection regions for transmitting light in at least one wavelength band among infrared light, red light, green light, and blue light. At least two of the imaging regions respectively corresponding to the at least two first wavelength selection regions are first imaging regions having sensitivity with respect to light in a wavelength band that is transmitted by the first wavelength selection regions.

The camera module further includes a distance calculation circuit for calculating a distance to an object based on at least two pieces of image information outputted respectively from the at least two first imaging regions.

The camera module outputs an image signal based on image information outputted from at least one of the plurality of imaging regions.

EFFECTS OF THE INVENTION

According to a camera module of the present invention, the distance to an object can be measured by triangulation, and an object image can be captured. Thus, the shape recognition of an object and the measurement of the distance to the object can be performed simultaneously.

Furthermore, since a plurality of lenses are integrated as a lens module, a plurality of independent cameras are not required. Thus, with a simple configuration, a small and low-cost camera module can be realized.

BRIEF DESCRIPTION OF DRAWINGS

FIG. 1 is an exploded perspective view of a camera module according to Embodiment 1 of the present invention.

FIG. 2 is a cross-sectional view of the camera module according to Embodiment 1 of the present invention.

FIG. 3 is a view illustrating the principle in which the camera module according to Embodiment 1 of the present invention measures the distance to an object.

FIG. 4 is a conceptual view of an optical filter module used in a camera module according to Embodiment 2 of the present invention.

FIG. 5 is a schematic perspective view of an exemplary optical filter module used in the camera module according to Embodiment 2 of the present invention.

FIG. 6 is a perspective view of an optical filter module used in a camera module according to Embodiment 3 of the present invention.

FIG. 7 is a front view showing a partially enlarged light incident plane of an imaging sensor used in a camera module according to the present invention.

FIG. 8 is a conceptual view illustrating the mechanism in which a pixel value of the imaging sensor is determined in the camera module according to the present invention.

FIG. 9 is a view showing the concept of a sub-pixel of the imaging sensor in a camera module according to Embodiment 4 of the present invention.

FIG. 10 is a view illustrating a method for obtaining a pixel value of the sub-pixel of the imaging sensor by interpolation in the camera module according to Embodiment 4 of the present invention.

FIG. 11 is a top view of an automobile that is traveling with a camera module according to Embodiment 5 of the present invention mounted thereon.

FIG. 12 is a perspective view showing the outer appearance of a camera module according to Embodiment 6 of the present invention.

FIG. 13 is a view showing the definitions of an X-axis, a Y-axis, and a Z-axis in FIG. 12.

FIG. 14 is a perspective view showing another rotation driving mechanism of the camera module according to Embodiment 6 of the present invention.

FIG. 15 is a view illustrating a method for calculating a vanishing point in a conventional stereo camera apparatus.

DESCRIPTION OF THE INVENTION

Figure 1:
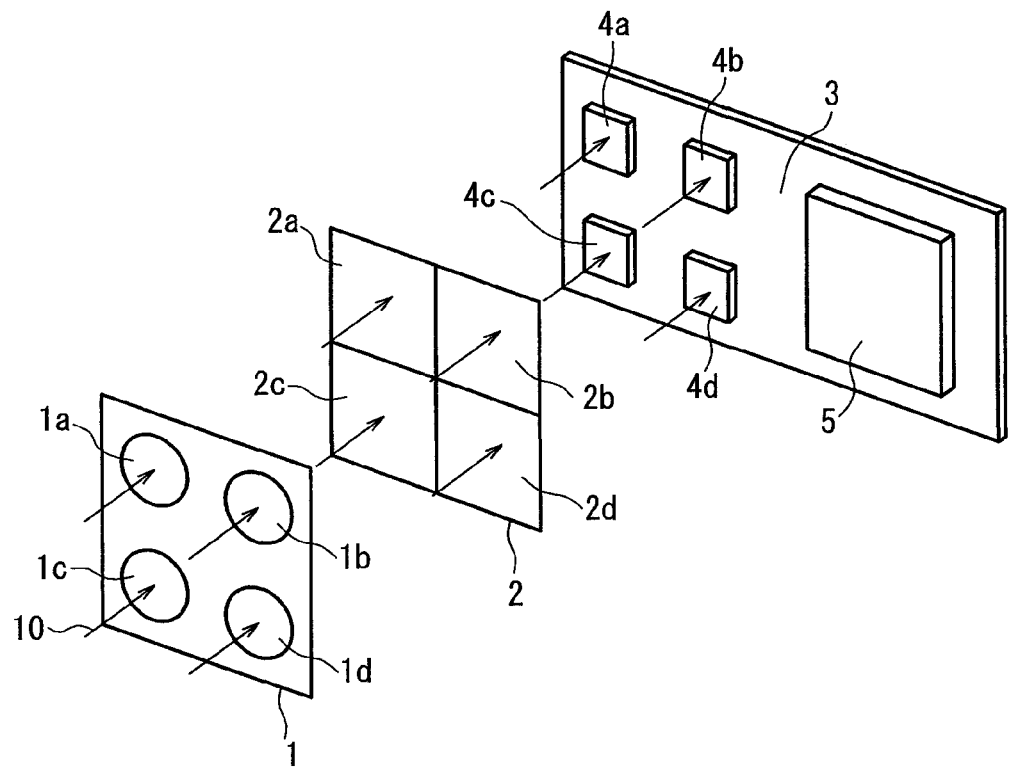
[FIG. 1]

In the above-mentioned camera module of the present invention, the at least two first wavelength selection regions may transmit infrared light selectively. According to this configuration, the distance to an object can be measured even in a dark environment such as nighttime. Furthermore, the use of infrared light enables a distance to be measured with high precision even using a single lens. Furthermore, the use of a single lens enables the camera module to be miniaturized further and decreased in cost.

Alternatively, the at least two first wavelength selection regions may selectively transmit light in any one wavelength band among red light, green light, and blue light. According to this configuration, the distance to an object can be measured in a light environment such as daytime. Furthermore, the use of light in a particular wavelength band among a visible light band enables a distance to be measured with high precision even using a single lens. Furthermore, the use of a single lens enables the camera module to be miniaturized further and decreased in cost.

Alternatively, the plurality of wavelength selection regions may include at least two infrared wavelength selection regions for selectively transmitting infrared light and at least two visible light wavelength selection regions for selectively transmitting light in any one wavelength band among red light, green light, and blue light. In this case, it is preferable that the distance calculation circuit calculates the distance to the object based on at least two pieces of image information outputted respectively from at least two infrared imaging regions corresponding to the at least two infrared wavelength selection regions, and calculates the distance to the object based on at least two pieces of image information outputted respectively from at least two visible light imaging regions corresponding to the at least two visible light wavelength selection regions. According to this configuration, the distance to an object can be measured with high precision at any time of day or night. Furthermore, the use of light in a particular wavelength band enables a distance to be measured with high precision even using a single lens. Furthermore, the use of a single lens enables the camera module to be miniaturized further and decreased in cost.

It is preferable that the at least two first wavelength selection regions are wavelength selection regions in which a red optical filter, a green optical filter, and a blue optical filter for transmitting light in wavelength bands of red light, green light, and blue light respectively are arranged in a Bayer array in accordance with an arrangement of the plurality of pixels. According to this configuration, a distance can be calculated based on the color image information. Since the color image information contains information in an amount larger than that of monochromatic image information, the measurement precision of a distance is enhanced remarkably.

When the first wavelength selection region selectively transmits infrared light, among the plurality of wavelength selection. regions, at least one excluding the first wavelength selection regions may be a wavelength selection region in which a red optical filter, a green optical filter, and a blue optical filter for transmitting light in wavelength bands of red light green light, and blue light respectively are arranged in a Bayer array in accordance with the arrangement of the plurality of pixels. In this case, it is preferable that at least one of the imaging regions corresponding to the at least one wavelength selection region that is arranged in a Bayer array has sensitivity with respect to visible light. According to this configuration, a camera module capable of measuring a distance even in a dark environment such as nighttime, and capturing a color image can be realized.

When the first wavelength selection region selectively transmits infrared light, among the plurality of wavelength selection regions, at least one excluding the first wavelength selection regions may be a second wavelength selection region for transmitting light in any one wavelength band among red light, green light, and blue light. In this case, it is preferable that a second imaging region corresponding to the second wavelength selection region has sensitivity with respect to light in a wavelength band transmitted by the second wavelength selection region. Then, it is preferable that the camera module further includes an image combination circuit for arithmetically obtaining one combined image based on the image information outputted from the first imaging region and the image information outputted from the second imaging region. Then, it is preferable that the camera module outputs a signal regarding the combined image as the image signal. According to this configuration, a camera module capable of measuring a distance even in a dark environment such as nighttime, and capturing an image at any time of day or night can be realized. Furthermore, since the information amount of an image signal to be outputted increases, for example, the precision of shape recognition and the like using the image signal is enhanced.

It is preferable that the above-mentioned camera module further includes an image combination circuit for arithmetically obtaining one combined image based on at least two pieces of image information outputted respectively from at least two of the imaging regions respectively corresponding to at least two of the wavelength selection regions for transmitting light in wavelength bands different from each other. In this case, it is preferable that the camera module outputs a signal regarding the combined image as the image signal. According to this configuration, since the information amount of an image signal to be outputted increases, for example, the precision of shape recognition using the image signal is enhanced.

It is preferable that the distance calculation circuit performs interpolation among the plurality of pixels based on the image information outputted from the first imaging region, and calculates the distance to the object using the information obtained by the interpolation. According to this configuration, the measurement precision bf a distance cab be enhanced without enlarging the distances among a plurality of lenses. Furthermore, a distance can be measured with good precision even with respect to a large distance as well as a small distance.

The camera module of the present invention may be mounted on an automobile, and used for obtaining information on an environment. According to this configuration, the preventive safety of an automobile is enhanced.

In this case, it is preferable that the above-mentioned camera module further includes a driving mechanism for changing a direction of the camera module in accordance with a vehicle speed signal and/or a turning signal of the automobile. According to this configuration, since the information on a situation in an intended traveling direction can be obtained before the traveling direction of an automobile changes actually, the safety is enhanced further.

Embodiment 1

Hereinafter, Embodiment 1 of the present invention will be described with reference to the drawings.

FIG. 1 is an exploded perspective view of a camera module of Embodiment 1.

A camera module of the present embodiment includes a lens module 1, an optical filter module 2, and a substrate 3 in this order from an object side. On the substrate 3, imaging devices 4a-4d, and a signal processing portion 5 composed of a digital signal processor (DSP) and the like are mounted. Arrows 10 represent light beams from the object.

Figure 2:
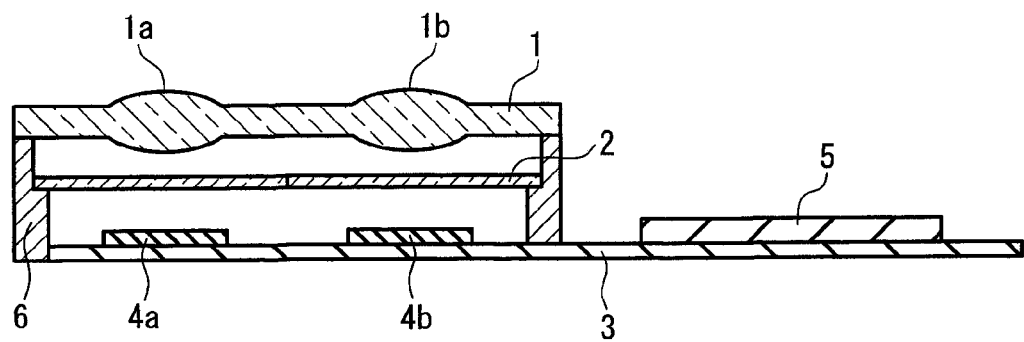
[FIG. 2]

FIG. 2 is a cross-sectional view of the camera module of the present embodiment along a direction parallel to an optical axis of the lens module 1. In FIG. 2, reference numeral 6 denotes a fixing stage for supporting and fixing the lens module 1 and the optical filter module 2 with respect to the substrate 3.

In FIG. 1, the optical filter module 2 has four wavelength selection regions 2a-2d. The wavelength selection regions 2a, 2d placed at positions diagonal to each other are respectively composed of an infrared optical filter for selectively transmitting infrared red light among light 10 from the object, and the wavelength selection regions 2b, 2c placed at positions diagonal to each other are respectively composed of a green optical filter for selectively transmitting green light among the light 10 from the object.

Four lenses 1a-1d are placed on the lens module 1, and the four imaging devices 4a-4d are placed on the substrate 3, so as to correspond to the four wavelength selection regions 2a-2d, respectively. More specifically, the four wavelength selection regions 2a-2d and the four imaging devices 4a-4d are placed on optical axes of the four lenses 1a-1d, respectively.

The lenses 1a, 1d corresponding to the wavelength selection regions 2a, 2d for transmitting infrared light are designed so as to satisfy a required optical specification such as an MTF in a wavelength band of infrared light, and the imaging devices 4a, 4d corresponding to the wavelength selection regions 2a, 2d have sensitivity in the wavelength band of infrared light. On the other hand, the lenses 1b, 1c corresponding to the wavelength selection regions 2b, 2c for transmitting green light are designed so as to satisfy a required optical specification such as an MTF in a wavelength band of green light, and the imaging devices 4b, 4c corresponding to the wavelength selection regions 2b, 2c have sensitivity at least in the wavelength band of green light. In the present embodiment, the imaging devices 4b, 4c have sensitivity in a wavelength band of visible light containing green light.

The lens module 1 having the four lenses 1a-1d is made of a material such as glass or plastic. The four lenses 1a-1d are formed integrally on the same plane. The respective lenses 1a-1d transmit the light 10 from the object through the respective wavelength selection regions 2a-2d, and thereafter allow the light 10 to form images on the respective imaging devices 4a-4d.

As the imaging devices 4a-4d, an imaging sensor such as a CCD can be used. Among the light transmitted through the respective lenses 1a-1d, light in a wavelength band of infrared light or green light is selected in the respective wavelength selection regions 2a-2d to pass therethrough, thereby forming an image on each of the imaging devices 4a-4d. More specifically, on the imaging devices 4a, 4d, only light in a wavelength band of infrared light among the light 10 from the object forms an image, and on the imaging devices 4b, 4c, only light in a wavelength band of green light among the light 10 from the object forms an image. Thus, the light 10 from the object is separated into light in a wavelength band of infrared light and light in a wavelength band of green light, which form images respectively on separate imaging devices.

Each of the imaging devices 4a-4d has a plurality of pixels for performing photoelectric conversion. Light in a particular wavelength band is incident upon each pixel of each of the imaging devices 4a-4d. Each of the imaging devices 4a-4d outputs an electric signal in accordance with the intensity of the incident light as image information.

Video processing composed of various signal processes is performed with respect to the image information. For example, the distance to an object is measured using two pieces of image information outputted from the two imaging devices upon which light in the same wavelength band is incident. Alternatively, a plurality of pieces of image information outputted from a plurality of imaging devices may be combined. These signal processes are performed in the signal processing portion 5 including a DSP.

The principle of measuring the distance to an object using a pair of optical systems designed for green light of the camera module of the present embodiment will be described with reference to FIG. 3.

Figure 3:
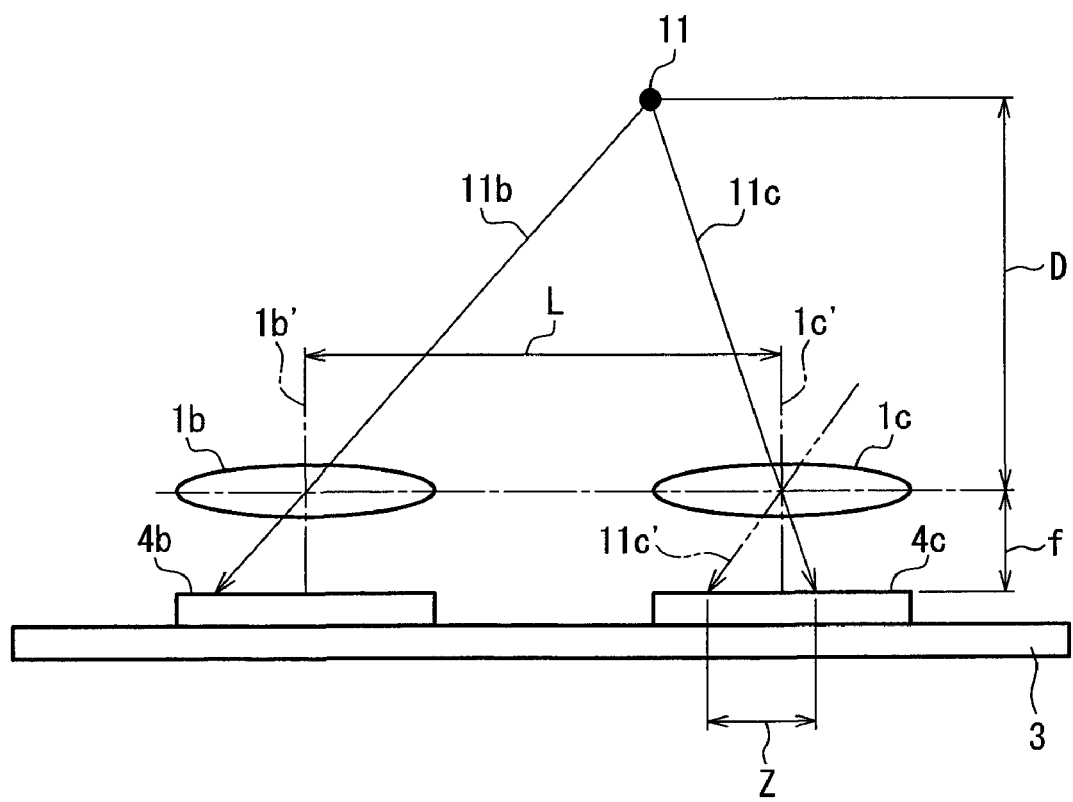
[FIG. 3]

As shown in FIG. 3, since a light beam 11b from an object 11, an image of which is formed on the imaging device 4b by the lens 1b, is different from a light beam 11c from the object 11, an image of which is formed on the imaging device 4c by the lens 1c, the image-formation position on the imaging device 4b of the light beam 11b is different from the image-formation position on the imaging device 4c of the light beam 11c. A virtual equivalent light beam 11c' will be considered, which has a relationship equivalent to the relationship between the light beam 11b and the lens 1b, with respect to the lens 1c. On the imaging device 4c, the image-formation position of the light beam 11c and the image-formation position of the equivalent light beam 11c' are displaced by a displacement amount Z based on the parallax.

Among the imaging devices 4b, 4c designed for green light, an image obtained by one imaging device 4b is assumed to be a reference image. A light-receiving region of the imaging device 4b is divided into a plurality of blocks (for example, one block is composed of 64 (8 rows×8 columns) pixels in total). Then, an image having a correlation with an image captured by a certain block of the imaging device 4b is searched for and specified in an image obtained by the other imaging device 4c. The difference between the position of the above-mentioned certain block in the imaging device 4b and the position of an image having a correlation with the certain block in the other imaging device 4c is obtained as the above-mentioned displacement amount Z. The displacement amount Z is obtained in terms of a pixel pitch of the imaging devices 4b, 4c.

A specific example will be described.

In FIG. 3, assuming that the distance from the lenses 1b, 1c to the object 11 is D [mm], the lenses 1b, 1c are identical lenses, the focal length thereof is f [mm], the interval between an optical axis 1b' of the lens 1b and an optical axis 1c' of the lens 1c is L [mm], the pixel pitch of the imaging devices 4b, 4c is p [mm], and the above-mentioned relative displacement amount Z between images having a correlation with each other is z [pixel pitch] (that is, a displacement amount Z=z×p), the distance D to the object can be obtained using the following Expression (1).

$$D = L \times f / (z \times p) \text{ [mm]} \tag{1}$$

For example, in a camera module in which the interval L between the optical axes 1b' and 1c' is 3 [mm], the focal length f is 3 [mm], the pixel pitch p is $2.8 \times 10^{-3}$ [mm], assuming that the displacement amount Z is 3 [pixel pitch], the distance D to the object is represented by Expression (1) as follows:

$$D = 3 \times 3 / (3 \times 2.8 \times 10^{-3}) \text{ [mm]}$$

$$\approx 1071 \text{ [mm]}$$

Thus, by detecting the displacement amount Z to be a 3-pixel pitch, the distance to the object can be calculated to be about 1 m. The above calculation can be performed by a distance calculation circuit in the signal processing portion 5 including a DSP.

In the camera module of the present embodiment, the lenses 1b and 1c are formed integrally as the lens module 1. Therefore, compared with a conventional distance measuring apparatus assembled using two cameras, the interval L between the optical axis 1b' and the optical axis 1c' can be decreased, and the precision regarding the interval L, the relative tilt of the optical axes 1b', 1c', and the like can be enhanced. Thus, a small and low-cost camera module can be realized, which is capable of measuring the distance to an object with high precision.

Furthermore, the lenses 1a-1d suffice if designed so as to satisfy a desired optical specification with respect to light in a particular wavelength band. Therefore, a single lens can be used as the lenses 1a-1d, whereby the camera module can be miniaturized further and decreased in cost.

In the above embodiment, the distance to an object is measured using a pair of optical systems designed for green light, composed of the wavelength selection regions 2b, 2c for transmitting green light, and the lenses 1b, 1c, and the imaging devices 4b, 4c corresponding to the wavelength selection regions 2b, 2c. However, the present invention is not limited thereto.

For example, the distance to an object may be measured using a pair of optical systems designed for infrared light, composed of the wavelength selection regions 2a, 2d for transmitting infrared light, and the lenses 1a, 1d and the imaging devices 4a, 4d corresponding to the wavelength selection regions 2a, 2d. If infrared light is used, the distance to an object can be measured even in a dark environment such as nighttime. Even in this case, the lenses 1a, 1d are formed integrally as the lens module 1, so that a small and low-cost camera module capable of measuring the distance to an object with high precision can be realized.

Furthermore, the distance to an object may be measured using both a pair of optical systems designed for green light and a pair of optical systems designed for infrared light. This can realize a small and low-cost camera module capable of measuring the distance to an object with high precision at any time of day or night.

In the above embodiment, an example has been described, which uses an optical filter for transmitting green light that is one of three primary colors of light as the wavelength selection regions 2b, 2c. However, an optical filter for selectively transmitting red light or blue light may be used, and even in this case, the same effect as that described above can be obtained.

The camera module of the present embodiment may output at least one piece of image information respectively outputted from the four imaging devices 4a-4d as an image signal. This can realize a small and low-cost camera module that outputs the information concerning a distance to an object and the information on an object image. The image information used as an image signal may be image information used for measuring a distance, and image information other than this. For example, if the image information outputted from the imaging device 4b (or 4c), upon which monochromatic light in a visible light band is incident, is outputted as an image signal, a monochromatic image captured in a light environment such as daytime can be obtained. Furthermore, if the image information outputted from the imaging device 4a (or 4d), upon which infrared light is incident, is outputted as an image signal, an image captured with infrared light in a dark environment such as nighttime can be obtained. Furthermore, if the image information outputted from the imaging device 4b (or 4c) is combined with the image information outputted from the imaging device 4a (or 4d) to be outputted as one image signal, a sharp image can be captured at any time of day or night, and the sensitivity of the imaging devices can be increased apparently. The combination of a plurality of pieces of image information can be performed by an image combination circuit in the signal processing portion 5 including a DSP.

Embodiment 2

Hereinafter, Embodiment 2 of the present invention will be described with reference to the drawings.

The entire configuration of a camera module of Embodiment 2 is substantially the same as that of the camera module of Embodiment 1 shown in FIGS. 1 and 2, and Embodiment 2 is different from Embodiment 1 in terms of individual constituent elements of the camera module. Hereinafter, Embodiment 2 will be described mainly based on the difference from Embodiment 1.

Figure 4:
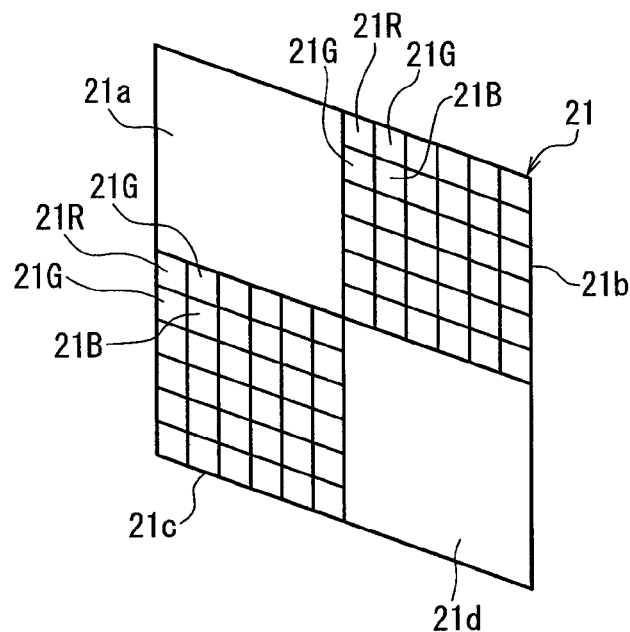
[FIG. 4]

FIG. 4 is a conceptual view of an optical filter module 21 used in the camera module according to Embodiment 2. In FIG. 4, wavelength selection regions 21a, 21d placed at positions diagonal to each other are respectively composed of an infrared optical filter for selectively transmitting infrared light among light from an object, and in wavelength selection regions 21b, 21c placed at positions diagonal to each other, red optical filters 21R, green optical filters 21G, and blue optical filters 21B for transmitting red light, green light, and blue light respectively are arranged in a Bayer array in accordance with the arrangement of pixels of imaging devices 4b, 4c corresponding to the wavelength selection regions 21b, 21c.

Lenses 1a, 1d corresponding to the wavelength selection regions 21a, 21d for transmitting infrared light are designed so as to satisfy a required optical specification such as an MFT in a wavelength band of infrared light, and furthermore, imaging devices 4a, 4d corresponding to the wavelength selection regions 21a, 21d have sensitivity in a wavelength band of infrared light. On the other hand, lenses 1b, 1c corresponding to the wavelength selection regions 21b, 21c in which the red optical filters 21R, the green optical filters 21G, and the blue optical filters 21B are arranged in a Bayer array are designed so as to satisfy a required optical specification such as an MTF in a wavelength band of visible light, and imaging devices 4b, 4c corresponding to the wavelength selection regions 21b, 21c have sensitivity in a wavelength band of visible light.

Figure 5:
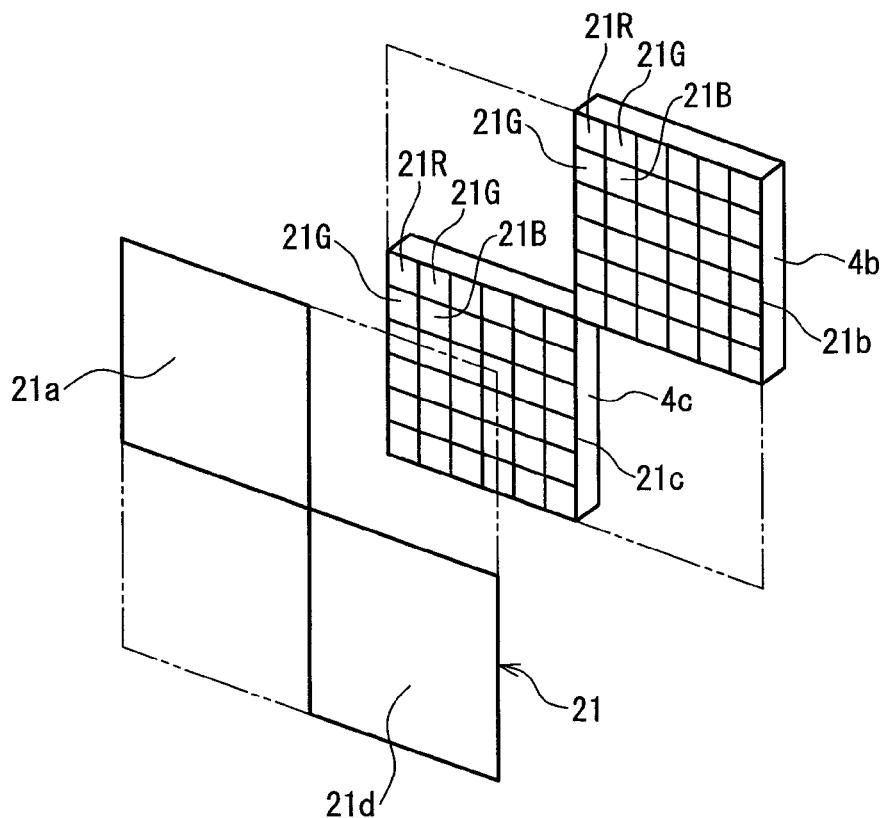
[FIG. 5]

For ease of understanding of the difference from other embodiments, FIG. 4 is drawn as if the wavelength selection regions 21a, 21d and the wavelength selection regions 21b, 21c constitute a common optical filter module 21. However, it is necessary to exactly align the red optical filters 21R, the green optical filters 21G, and the blue optical filters 21B that are arranged in a Bayer array, with light-receiving portions of respective pixels of the imaging devices 4b, 4c. Thus, actually, it is necessary to form the red optical filters 21R, the green optical filters 21G, and the blue optical filters 21B directly on the pixels of the imaging devices 4b, 4c by the Bayer array. Accordingly, for example, as shown in FIG. 5, the wavelength selection regions 21b, 21c, in which the red optical filters 21R, the green optical filters 21G, and the blue optical filters 21B are arranged in a Bayer array, are formed on the imaging devices 4b, 4c, separately from the optical filter module 21 on which the wavelength selection regions 21a, 21d for transmitting infrared light are provided.

Embodiment 2 is different from Embodiment 1 in the following: in Embodiment 1, only light in any one wavelength band among red light, green light, and blue light is incident upon the imaging devices 4b, 4c, while in Embodiment 2, all the light in a visible light band is incident upon the imaging devices 4b, 4c. That is, the imaging devices 4b, 4c output monochromatic image information in Embodiment 1, while they output color image information in Embodiment 2.

The distance to an object can be measured in the same way as in Embodiment 1 based on two pieces of color image information obtained from the imaging devices 4b, 4c. Three components: a brightness, a hue, and a chroma can be extracted from each wavelength component of red, green, and blue contained in the color image information. The regions that are connected geometrically in an object have similar colors in most cases, so that particular images having a correlation in two color images are searched for and extracted, using the color information, whereby a displacement amount Z can be obtained. Thus, compared with the case where a distance is measured using a monochromatic image, the precision of searching for and extracting particular images can be enhanced remarkably. This enhances the measurement precision of a distance remarkably.

Needless to say, as described in Embodiment 1, the distance to an object may be measured, using a pair of optical systems designed for infrared light, composed of the wavelength selection regions 21a, 21d for transmitting infrared light, and the lenses 1a, 1d and the imaging devices 4a, 4d corresponding to the wavelength selection regions 21a, 21d. If infrared light is used, the distance to an object can be measured even in a dark environment such as nighttime.

Furthermore, the distance to an object may be measured using both a pair of optical systems designed for infrared light, and a pair of optical systems designed for visible light composed of the wavelength selection regions 21b, 21c, the lenses 1b, 1c and the imaging devices 4b, 4c corresponding to the wavelength selection regions 21b, 21c. This can realize a small and low-cost camera module capable of measuring the distance to an object with high precision at any time of day or night.

In the same way as in the case of Embodiment 1, the camera module of the present embodiment may output at least one piece of image information outputted respectively from the four imaging devices 4a-4d as an image signal. This can realize a small and low-cost camera module that outputs the information on the distance to an object and the information on an object image. The image information used as an image signal may be image information used for measuring a distance, or image information other than this. For example, if the image information outputted from the imaging device 4b (or 4c), upon which light in a visible light band is incident, is outputted as an image signal, a color image captured in a light environment such as daytime can be obtained. Furthermore, if the image information outputted from the imaging device 4a (or 4d), upon which infrared light is incident, is outputted as an image signal, an image captured with infrared light in a dark environment such as nighttime can be obtained. Furthermore, if the image information outputted from the imaging device 4b (or 4c) and the image information outputted from the imaging device 4a (or 4d) are combined to be outputted as one image signal, a sharp image can be captured at any time of day or night using light in an entire wavelength band from visible light to infrared light, and the sensitivity of the imaging devices can be enhanced apparently. A plurality of pieces of image information can be combined by an image combination circuit in the signal processing portion including a DSP.

In the case where the image signal outputted from the camera module contains color image information, the following effect is obtained. Three components: a brightness, a hue, and a chroma can be extracted from each wavelength component of red, green, and blue contained in the color image information. For example, in the case where the shape of an object is recognized using the image signal, the regions that are connected geometrically in the object have similar colors in most cases, so that the characteristic portions of the object can be extracted easily with high precision, using color information. Thus, compared with the case where the shape is recognized using monochromatic image information, the shape recognition precision can be enhanced remarkably.

Embodiment 3

Hereinafter, Embodiment 3 of the present invention will be described with reference to the drawings.

The entire configuration of the camera module of Embodiment 3 is substantially the same as that of the camera module of Embodiment 1 shown in FIGS. 1 and 2, and Embodiment 3 is different from Embodiment 1 in terms of individual constituent elements of the camera module. Hereinafter, Embodiment 3 will be described mainly based on the difference from Embodiment 1.

Figure 6:
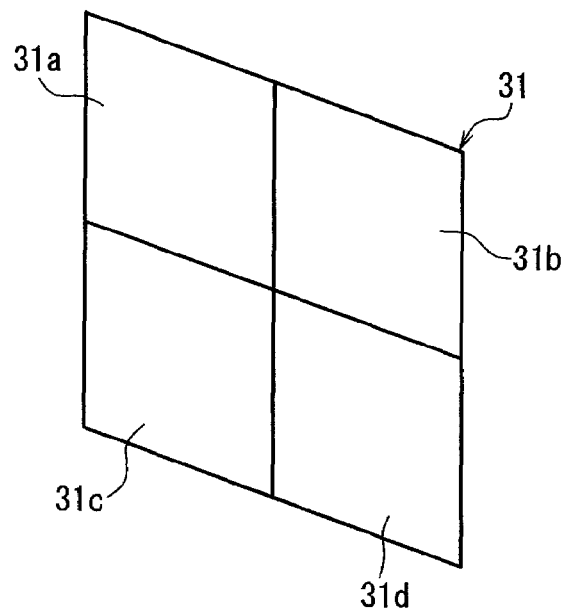
[FIG. 6]

FIG. 6 is a perspective view of an optical filter module 31 used in the camera module according to Embodiment 3. In FIG. 6, wavelength selection regions 31b, 31c placed at positions diagonal to each other are respectively composed of a green optical filter for selectively transmitting green light among light from an object, a wavelength selection region 31a is composed of a red optical filter for selectively transmitting red light among the light from the object, and a wavelength selection region 31d is composed of a blue optical filter for selectively transmitting blue light among the light from the object.

Lenses 1b, 1c corresponding to the wavelength selection regions 31b, 31c for transmitting green light are designed so as to satisfy a required optical specification such as an MTF in a wavelength band of green light. A lens 1a corresponding to the wavelength selection region 31a for transmitting red light is designed so as to satisfy a required optical specification such as an MTF in a wavelength band of red light. A lens 1d corresponding to the wavelength selection region 31d for transmitting blue light is designed so as to satisfy a required optical specification such as an MTF in a wavelength band of blue light. Imaging devices 4a-4d have sensitivity at least in a wavelength band of light transmitted by the respective corresponding wavelength selection regions 31a-31d. In the present embodiment, the imaging devices 4a-4d have sensitivity in a wavelength band of visible light.

The light from the object passes through each of the lenses 1a-1d. After that, light in a particular wavelength band is selected in each of the wavelength selection regions 31a-31d to pass therethrough, and forms an image on each of the imaging devices 4a-4d. Each of the imaging devices 4a-4d outputs an electric signal in accordance with the intensity of the incident light as image information.

In the same way as described in Embodiment 1, the distance to an object is measured using a pair of optical systems designed for green light, composed of the wavelength selection regions 31b, 31c for transmitting green light, and the lenses 1b, 1c and the imaging devices 4b, 4c corresponding to the wavelength selection regions 31b, 31c. This will be outlined below.

It is assumed that an image obtained by one imaging device 4b among the imaging devices 4b, 4c designed for green light is a reference image. A light-receiving region of the imaging device 4b is divided into a plurality of blocks (for example, one block is composed of 64 (8 rows×8 columns) pixels in total). Then, an image having a correlation with an image captured by a certain block of the imaging device 4b is searched for and specified in an image obtained by the other imaging device 4c. The difference between the position of the above-mentioned certain block in one imaging device 4b and the position of the image having a correlation with the certain block in the other imaging device 4c is obtained as a displacement amount Z. A distance D to an object is calculated in the same way as described in Embodiment 1, based on the displacement amount Z.

In the present embodiment, in addition to the above-mentioned distance measurement, image information regarding three monochromatic light beams outputted respectively from the imaging device 4a designed for red light, the imaging device 4d (or 4b) designed for green light, and the imaging device 4d designed for blue light is combined, whereby one color image information can be obtained.

The image information on three monochromatic light beams is combined as follows. The displacement amount of each image of red and blue obtained by the imaging devices 4a, 4d with respect to an image (reference image) of green obtained by the imaging device 4b is calculated based on the above displacement amount Z obtained from the image information respectively outputted from the imaging devices 4b, 4d designed for green light. Then, the displacement amount of each image of red and blue is corrected, and each image of red and blue is combined with the reference image of green. This enables a color image without any color displacement to be obtained. The combination of a plurality of pieces of image information as described above can be performed in an image combination circuit in a signal processing portion 5 including a DSP.

In the same way as in the case of Embodiment 1, the camera module of the present embodiment may output at least one piece of the image information outputted respectively from the four imaging devices 4a-4d, and/or the above-mentioned color image information obtained by the combination as an image signal. This can realize a small and low-cost camera module that outputs the information on the distance to an object and the information on an object image.

In the case where an image signal to be outputted is color image information, the following effect is obtained. Three components: a brightness, a hue, and a chroma can be extracted from each wavelength component of red, green, and blue contained in the color image information. For example, in the case where the shape of an object is recognized using the image information, the regions that are connected geometrically in the object have similar colors in most cases, so that the characteristic portions of the object can be extracted easily with high precision, using color information. Thus, compared with the case where the shape is recognized using monochromatic image information, the shape recognition precision can be enhanced remarkably.

Embodiment 4

Hereinafter, Embodiment 4 of the present invention will be described.

Each pixel of an imaging sensor such as a CCD subjects incident light to photoelectric conversion, and outputs an electric signal (hereinafter, referred to as a "pixel value") in accordance with the intensity of the incident light. Since a light-receiving plane of each pixel has a predetermined area, the pixel value is an integral value of the intensity of light at each point in the light-receiving plane of the pixel.

Figure 7:
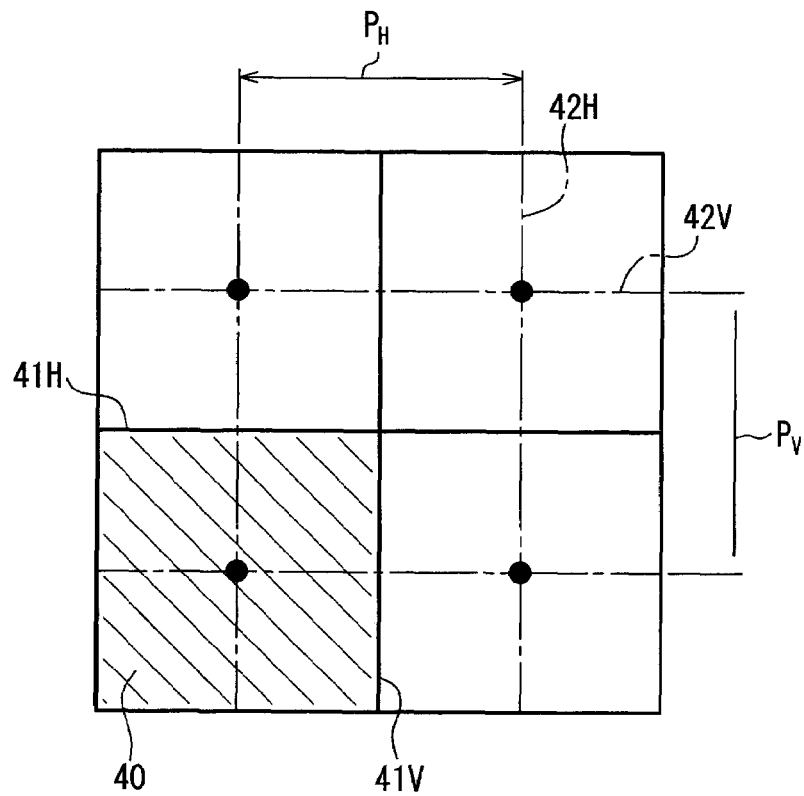
[FIG. 7]

FIG. 7 is a front view showing a partially enlarged light incident plane of the imaging sensor. Each region partitioned by solid lines 41H, 41V represents one pixel 40. FIG. 7 shows 4 (2 rows×2 columns) pixels in total. A shaded region represents a light-receiving plane of one pixel 40. Dotted lines 42H, 42V are center lines of a pixel row and a pixel column, and pass through the center of the light-receiving plane of each pixel 40. Intervals of the center lines 42H, 42V are referred to as pixel pitches $P_H$, $P_V$.

Figure 8:
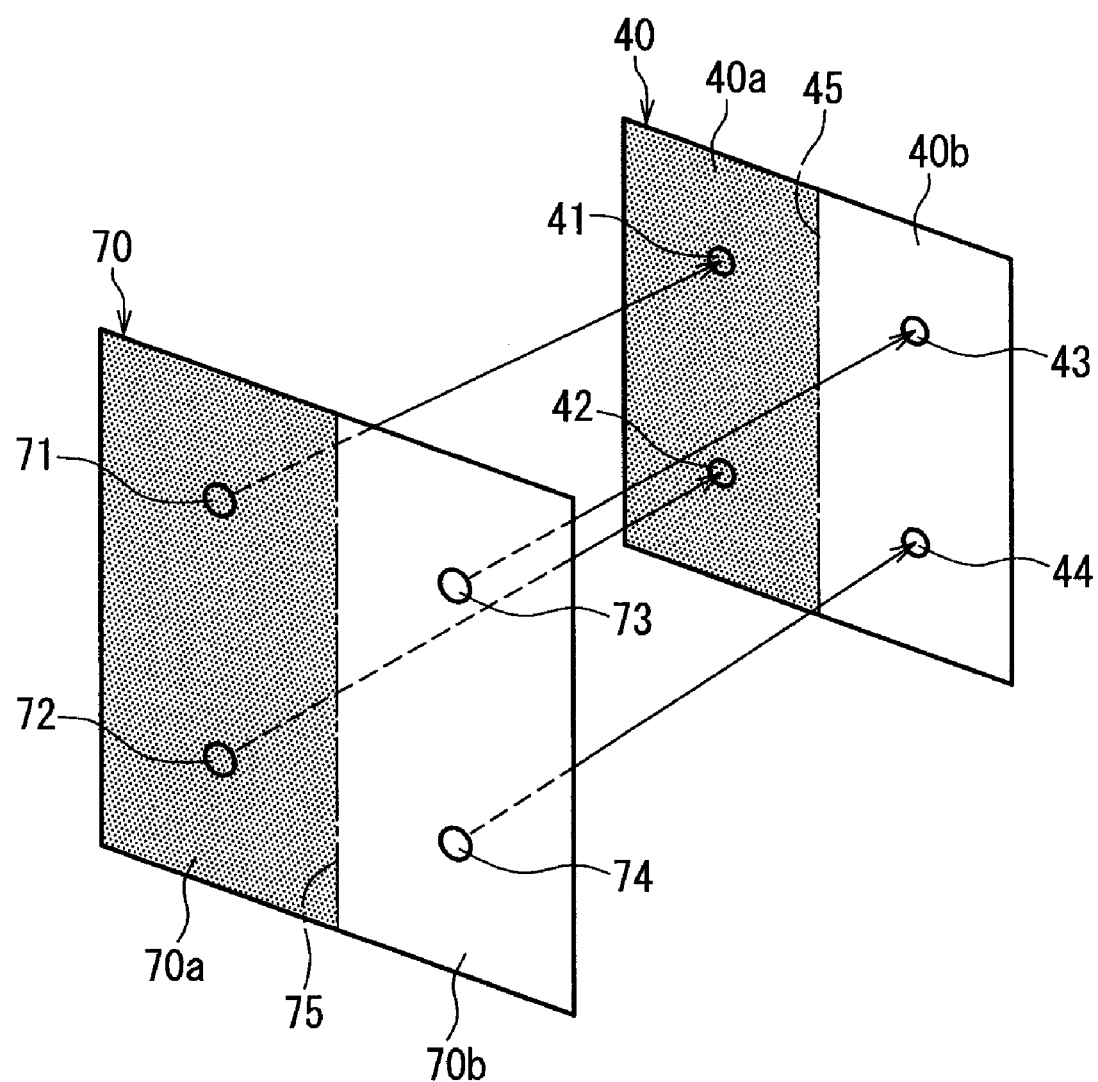
[FIG. 8]

As shown in FIG. 8, the case where an object 70 is incident upon the light-receiving plane of the pixel 40 will be described. Herein, it is assumed that one side of the object 70 with respect to a center line 75 is a uniform black region 70a, and the other side is a uniform white region 70b. The area of the black region 70a is the same as that of the white region 70b. Points 71, 72 in the black region 70a form images at points 41, 42 in the light-receiving plane of the pixel 40, and points 73, 74 in the white region 70b form images at points 43, 44 in the light-receiving plane. Alternate long and short dashed lines 45 correspond to the center line 75 of the object 70, and in the light-receiving plane of the pixel 40, the light intensity of a region 40a on the side corresponding to the black region 70a with respect to the alternate long and short dashed lines 45 is small, and the light intensity of the region 40b on the side conespondingto the white region 70b with respect to the alternate long and short dashed lines 45 is large. In such a case, the pixel value of the pixel 40 becomes equal to that in the case where light with an intermediate intensity between the light intensity in the region 40a and the light intensity in the region 40b is incident upon the entire light-receiving plane of the pixel 40.

According to the method for measuring the distance to an object using triangulation described in Embodiments 1 to 3, the displacement amount Z was obtained from the positions of images that are present respectively in two pieces of image information and have a correlation with each other. The image information used at this time is composed of a pixel value outputted from each pixel of the imaging sensor. As shown in FIG. 8, even in the case where the intensity of light that is incident upon the light-receiving plane of the pixel 40 is not uniform, the light intensity distribution in the light-receiving plane is averaged when a pixel value is outputted. Thus, the detection precision of the displacement amount Z depends upon the pixel pitches $P_H$, $P_V$.

As is apparent from the above, it is understood that if the light intensity distribution in the light-receiving plane of the pixel 40 can be detected, the detection precision of the displacement amount Z is enhanced, and consequently, the measurement precision of the distance to an object can be enhanced.

Furthermore, as is apparent from FIG. 3 that has already been described, as the distance D from a lens to an object increases, the measurement precision of the distance D decreases. However, if the light intensity distribution in the light-receiving plane can be detected, the detection precision of the displacement amount Z is enhanced, so that the distance to a farther object can be measured with good precision.

In the present embodiment, pixels are subjected to interpolation based on the pixel information composed of a pixel value outputted from each pixel, whereby the light intensity distribution in a light-receiving plane of each pixel is detected. More specifically, the pixel pitches $P_H$, $P_V$ are shortened spuriously. Hereinafter, this will be described.

Figure 9:
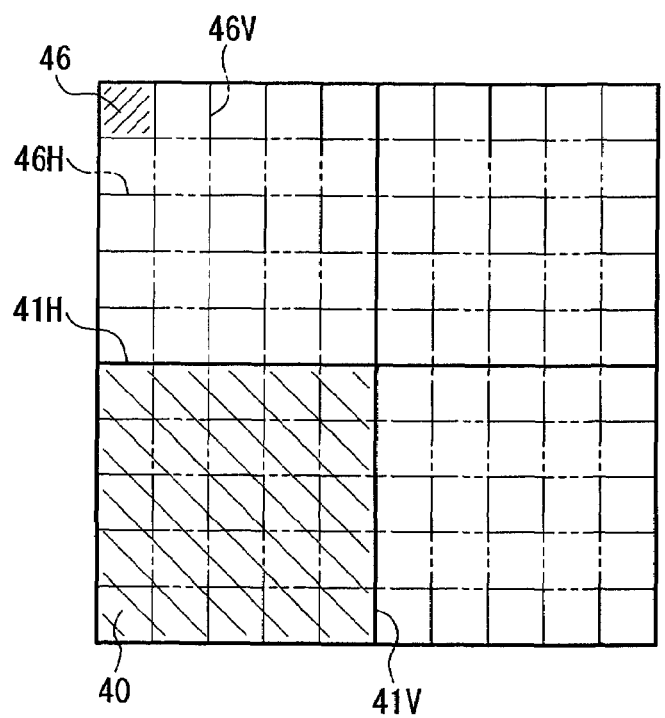
[FIG. 9]

As shown in FIG. 9, a light-receiving plane of each pixel 40 is divided into a plurality of smaller regions (hereinafter, referred to as "sub-pixels") 46. In the example shown in FIG. 9, one pixel 40 is composed of a collection of 25 (5 rows×5 columns) sub-pixels in total. In FIG. 9, solid lines 41H, 41V represent boundaries of the pixels 40, and chain double-dashed lines 46H, 46V represent boundaries of the sub-pixels 46.

The distance to an object is measured as follows. In the same way as described in Embodiment 1, it is assumed that an image obtained by one imaging device 4b among imaging devices 4b, 4c designed for green light is a reference image. Then, an image having a correlation with an image captured by a certain block in the imaging device 4b is searched for and specified in an image obtained by the other imaging device 4c. At this time, in Embodiment 1, a plurality of pixels are set to be one block; however, in the present embodiment, a plurality of sub-pixels are set to be one block. More specifically, in the present embodiment, the correlation between two images is investigated on a sub-pixel basis, not on a pixel basis. This can enhance the measurement precision of the distance to an object. Furthermore, the distance to a farther object as well as a closer object can be measured with good precision.

In Embodiment 1, the displacement amount Z was detected on a pixel pitch basis, and for example, if the displacement amount Z was a 3-pixel pitch, the distance D to the object was calculated to be about 1 m. In contrast, according to the present embodiment, for example, in the case where one pixel is divided into sub-pixels of 10 rows×10 columns, the displacement amount Z can be detected on a 0.1-pixel pitch basis (that is, on a 1-sub-pixel pitch basis). In this case, for example, if the displacement amount Z is a 0.3-pixel pitch (that is, a 3-sub-pixel pitch), the distance D to the object can be calculated to be about 10 m, and hence, even the distance to a farther object can be measured with good precision. Furthermore, the displacement amount Z can be detected on a 0.1-pixel pitch basis (that is, on a 1-sub-pixel pitch basis) with respect to an object at a distance of about 1 m, so that the measurement precision is enhanced 10-fold.

Figure 10:
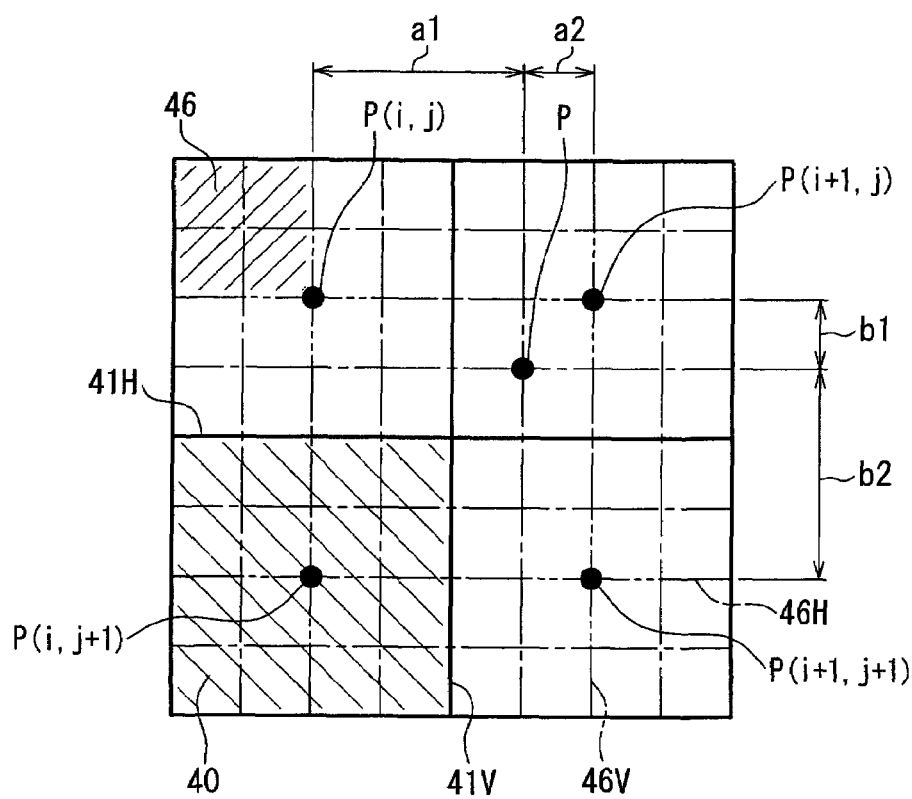
[FIG. 10]

The pixel value of each sub-pixel (hereinafter, referred to as a "sub-pixel value") can be obtained, for example, by interpolating a pixel value outputted from one pixel of an imaging device by linear interpolation. This will be described with reference to FIG. 10 showing the case where each pixel 40 is divided into 4 (2 rows×2 columns) sub-pixels 46 in total.

It is assumed that the pixel value outputted from each pixel 40 is at the center of the pixel, and the sub-pixel value outputted from each sub-pixel 46 also is at the center of the sub-pixel. As shown in FIG. 10, it is assumed that the pixel values of respective pixels arranged in 2 rows×2 columns are P(i, j), P(i, j+1), P(i+1, j), and P(i+1, j+1), and the sub-pixel value of a sub-pixel desired to be obtained is P. Assuming that the distances from the pixel values of the respective pixels to the sub-pixel value P of the sub-pixel are a1, a2, b1, and b2, respectively, the sub-pixel value P of the sub-pixel can be obtained by the following expression.

$$P=\{1/(b1+b2)\}\times[\{b2/(a1+a2)\}\times\{a2\times P(i, j)+a1\times P(i+1, j)\}+\{b1/(a1+a2)\}\times\{a2\times P(i+1, j+1)+a1\times P(i, j+1)\}]$$

Thus, the sub-pixel values of all the sub-pixels in each pixel can be obtained by an arithmetic operation.

Furthermore, in obtaining a sub-pixel value of the sub-pixel 46, the presence/absence of an edge (contour) of an object whose image is formed on a light-receiving plane of a certain sub-pixel may be detected using the sub-pixel values of sub-pixels surrounding the certain sub-pixel, and in the case where it is determined that there is an edge, the edge in the certain sub-pixel may be obtained by interpolation. Furthermore, a method for detecting the edge may be combined with the above-mentioned linear interpolation of a sub-pixel value of the sub-pixel 46.

In the above, an example has been shown in which one pixel is divided into 25 (5 rows×5 columns) sub-pixels in total, and into 4 sub-pixels (2 rows×2 columns) in total. However, the division number of one pixel is not limited to the above, and may be determined appropriately depending upon a required measurement precision and the like.

Embodiment 5

Hereinafter, Embodiment 5 of the present invention will be described with reference to the drawings.

Figure 11:
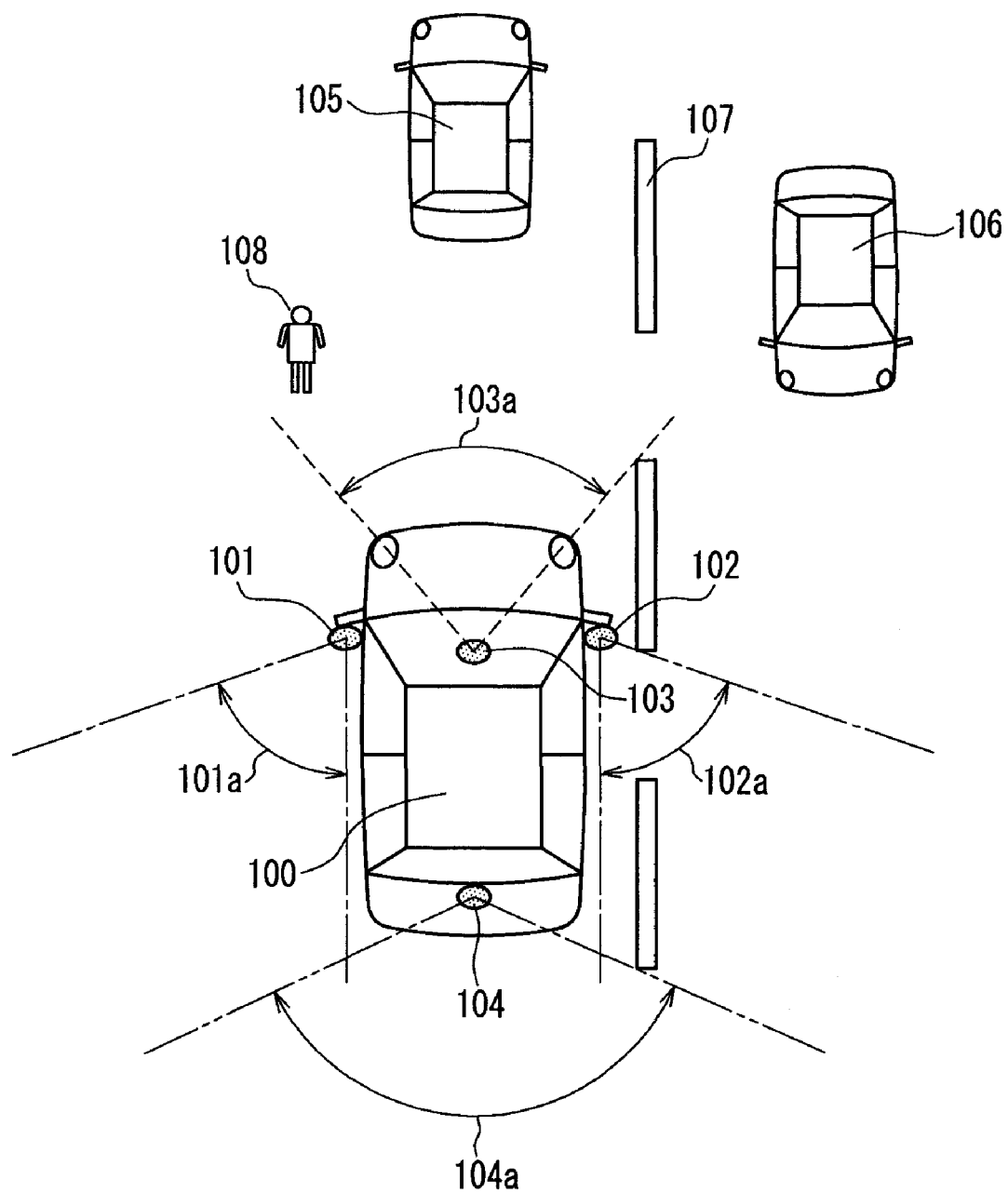
[FIG. 11]

FIG. 11 is a view of an automobile 100 traveling on a road seen from above. Camera modules 101-104 of the present invention are mounted on the automobile 100. Reference numerals 101a-104a denote the angles of view of the camera modules 101-104. Reference numeral 105 denotes a preceding vehicle, 106 denotes an oncoming vehicle, 107 denotes a center line (white line) of the road, and 108 denotes a pedestrian. A plurality of camera modules 101-104 are mounted on the automobile 100 so that the respective angles of view 101a-104a overlap each other as much as possible, whereby a blind spot from a driver's seat is eliminated, and information on an environment such as the pedestrian 108, the white line 107, the oncoming vehicle 106, and the preceding vehicle 105, and the like can be detected using the imaging information obtained from the camera modules 101-104.

Considering the design, aerodynamic characteristics, and the like of a vehicle, it is desirable that the camera modules 101-104 are thin and small. In the camera module of the present invention, the wavelength band of light that forms an image on the imaging device is limited by the wavelength selection region, so that an image with less aberration can be obtained even using a single lens as a lens. Thus, a very thin and small camera module can be realized.

Furthermore, by combining the information on the distance to an object obtained by the camera modules 101-104 with a vehicle speed signal and/or a turning signal of the automobile 100, the preventive safety of the automobile 100 can be enhanced.

Furthermore, the distance to an object is measured using a visible light band and an infrared band, whereby a light object such as a headlight of an oncoming vehicle and a dark object such as a pedestrian can be recognized even during traveling at night as well as during traveling in the daytime, and the distances to these objects can be obtained.

Furthermore, in the case where the camera module captures color image information, three components: a brightness, a hue, and a chroma can be extracted from each wavelength component of red, green, and blue contained in the color image information, whereby color information can be used for extracting characteristic portions of an object. Therefore, the shape recognition precision is enhanced remarkably compared with the case where monochromatic image information is used.

FIG. 11 shows the case where the information on the environment obtained by the camera module is information outside of the automobile 100. However, needless to say, the information on the environment obtained by the camera module may be information inside of the automobile.

Furthermore, an image signal obtained from each of the camera modules 101-104 also can be displayed using a display apparatus (not shown). This may be combined with the information on the distance to an object obtained from the camera modules 101-104. Consequently, for example, when the automobile 100 is backed up, etc., an obstacle can be displayed on the display apparatus together with the information on the distance to the obstacle momentarily.

Embodiment 6

Hereinafter, Embodiment 6 of the present invention will be described with reference to the drawings.

When a camera module is fixed to an automobile, the imaging range of the camera module depends upon the direction of the automobile. For example, in the case where the camera module is fixed so as to capture the information on a forward situation in a traveling direction of the automobile, when the traveling direction of the automobile changes, new information on a forward situation in the traveling direction cannot be captured until the traveling direction of the automobile changes.

However, the automobile is moving at a certain speed, so that it is desirable to obtain the information on a situation in a direction in which the automobile is to travel quickly (preferably before the traveling direction changes) and exactly in terms of safety.

Figure 12:
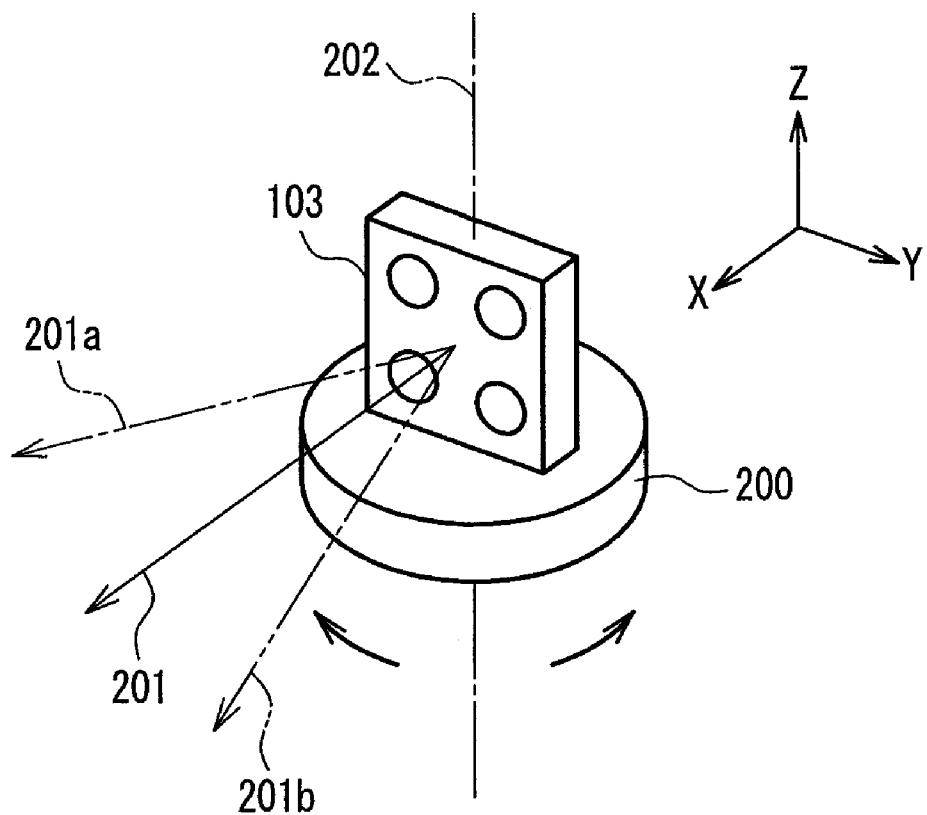
[FIG. 12]
Figure 13:
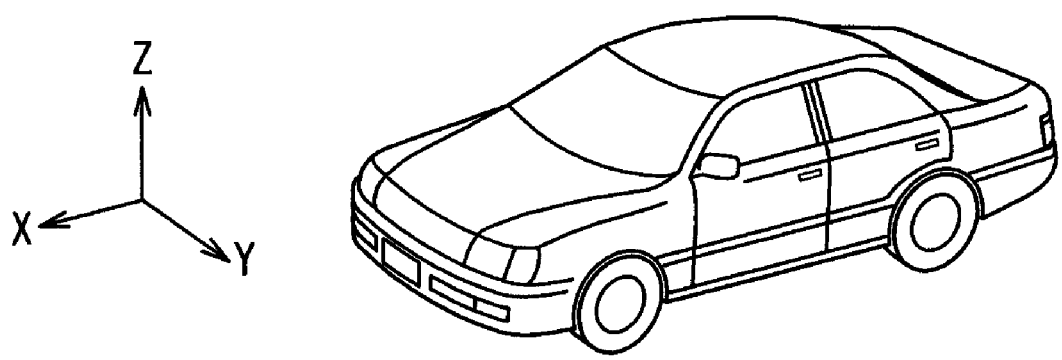
[FIG. 13]

In order to obtain the information on a situation more quickly, the camera module 103 of the present embodiment is mounted on a rotation table 200 that can rotate with respect to a Z-axis, as shown in FIG. 12. An X-axis, a Y-axis, and a Z-axis in FIG. 12 are set as shown in FIG. 13. More specifically, the positive direction of the X-axis corresponds to a forward side in the traveling direction of the automobile, the Y-axis direction corresponds to both side directions of the automobile, and the Z-axis direction corresponds to a vertical direction. The rotation angle around the Z-axis and the rotation speed (angular speed) of the rotation table 200 are determined in accordance with the change in the traveling direction of the automobile presumed based on the vehicle speed signal and/or the turning signal of the automobile on which the camera module 103 is to be mounted. Due to the rotation of the rotation table 200, the direction of the camera module 103 changes in a range of arrows 201a-201b in a plane parallel to an XY-plane, with a direction 201 parallel to the X-axis as a reference.

The camera module 103 is rotated around the Z-axis in expectation of the change in the traveling direction of the automobile, whereby the information on a situation in an intended traveling direction can be obtained before the traveling direction of the automobile changes actually, so that the safety is enhanced further.

Figure 14:
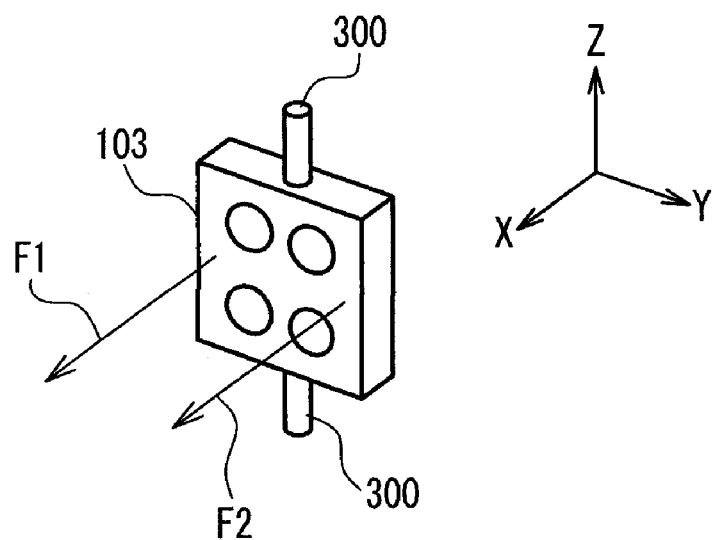
[FIG. 14]
Figure 15:
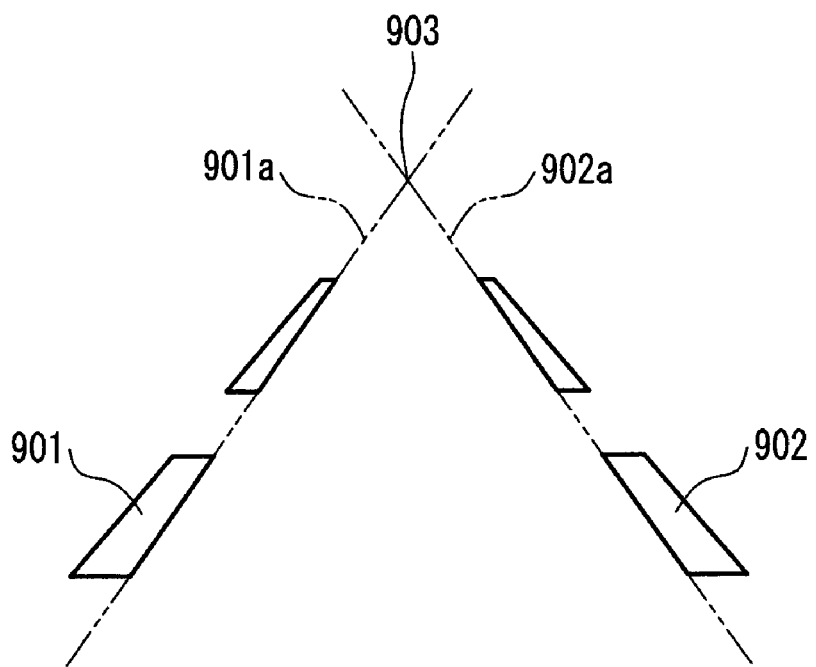
[FIG. 15]

In FIG. 12, although the rotation table 200 is used as a driving mechanism for changing the direction of the camera module 103, the present invention is not limited thereto. For example, as shown in FIG. 14, the camera module 103 may be rotated around the Z-axis by supporting the camera module 103 with a torsion bar 300 extending in parallel to the Z-axis, and applying a force F1 (or F2) substantially parallel to the X-axis to a side end of the camera module 103. The driving mechanism for changing the direction of the camera module 103 can be selected appropriately considering the space in which the camera module 103 is mounted.

Although the camera modules of Embodiments 1 to 6 have four lenses, the present invention is not limited thereto. If the camera module has at least two lenses, the above-mentioned distance measurement with high precision can be performed.

Furthermore, the arrangement of lenses used for measuring the distance to an object is not limited to the examples shown in the above-mentioned Embodiments 1-6, and can be changed appropriately considering the parallax, measurement precision, and the like.

Furthermore, in the camera modules of Embodiments 1-6, although the optical path extending from a lens to an imaging device is linear, the present invention is not limited thereto. For example, even with a reflection type in which an optical path is bent using a prism, a mirror, or the like, the effect similar to the above can be obtained.

Furthermore, in the above-mentioned camera modules of Embodiments 1 to 6, a plurality of imaging devices are used as a plurality of imaging regions. However, the present invention is not limited thereto, and for example, a plurality of imaging regions may be obtained by dividing a single imaging device into a plurality of regions. This makes it unnecessary to align a plurality of imaging devices, and can simplify mounting and decrease cost.

Furthermore, in the above-mentioned Embodiments 1-6, the camera modules have been shown in which an optical system composed of a lens module, an optical filter module, and an imaging region is integrated with a signal processing portion including a distance calculation circuit and/or an image combination circuit. However, the camera module of the present invention is not limited thereto. For example, the optical system and the signal processing portion may be connected to each other only with a flexible cable. Alternatively, the signal processing portion mounted on a substrate common to the imaging region may not include a distance calculation circuit and/or an image combination circuit, and the distance calculation circuit and/or the image combination circuit may be connected to the signal processing portion only with a flexible cable. With such a configuration, the optical system and the signal processing portion (or the distance calculation circuit and/or the image combination circuit) can be arranged freely at separate positions.

In assembly of the camera module of the present invention, it is necessary to align the optical axes of the respective lenses 1a-1d in the lens module 1 with the reference positions on the respective imaging devices 4a-4d. According to the present invention, this can be performed as follows. Components such as the fixing stage 6 and the lens module 1 are finished with a required precision and shape, and these components are assembled mechanically. After that, a point light source at infinity is captured, and image-formation points on the respective imaging devices 4a-4d of the point light source are assumed to be origins of the respective imaging devices 4a-4d. This can simplify greatly the adjustment of an optical system during assembly.

The embodiments described above are strictly intended to clarify the technical contents of the present invention, and the present invention should not be interpreted by being limited only to such specific examples, can be carried out by being varied within the spirit of the present invention and the scope of the claims, and should be interpreted in a broad sense.

INDUSTRIAL APPLICABILITY

The applicable field of the camera module of the present invention is not particularly limited, and is useful for, a small and slim camera mounted on a mobile telephone, a digital still camera, a monitoring camera, and a vehicle-mounted camera.

The invention claimed is:

1. A camera module, comprising:
   a lens module having a plurality of lenses arranged on a same plane;
   a plurality of wavelength selection regions each having at least one optical filter for selectively transmitting light in a particular wavelength band among light from an object; and
   a plurality of imaging regions having a plurality of pixels and outputting image information in accordance with incident light,
   wherein the plurality of lenses, the plurality of wavelength selection regions, and the plurality of imaging regions are arranged in one-to-one correspondence,
   the plurality of wavelength selection regions include at least two infrared wavelength selection regions for selectively transmitting infrared light, and at least two visible light wavelength selection regions for selectively transmitting light in at least one wavelength band among red light, green light and blue light,
   at least two of the imaging regions respectively corresponding to the at least two infrared wavelength selection regions are first imaging regions having sensitivity with respect to light in a wavelength band that is transmitted by the infrared wavelength selection regions,
   at least two of the imaging regions respectively corresponding to the at least two visible light wavelength selection regions are second imaging regions having sensitivity with respect to light in a wavelength band that is transmitted by the visible light wavelength selection regions,
   the camera module further comprises a distance calculation circuit for calculating a distance to an object based on at least two pieces of image information outputted respectively from at least two of the first imaging regions, and calculating the distance to the object based on at least two pieces of image information outputted respectively from at least two of the second imaging regions, and
   the camera module outputs an image signal based on image information outputted from at least one of the plurality of imaging regions.

2. The camera module according to claim 1, wherein the at least two visible light wavelength selection regions selectively transmit light in any one wavelength band among red light, green light, and blue light.

3. The camera module according to claim 1, wherein the at least two visible light wavelength selection regions are wavelength selection regions in which a red optical filter, a green optical filter, and a blue optical filter for transmitting light in wavelength bands of red light, green light, and blue light respectively are arranged in a Bayer array in accordance with an arrangement of the plurality of pixels.

4. The camera module according to claim 1, further comprising an image combination circuit for arithmetically obtaining one combined image based on the image information outputted from the first imaging regions and the image information outputted from the second imaging regions, and the camera module outputs a signal regarding the combined image as the image signal.

5. The camera module according to claim 1, wherein the distance calculation circuit performs interpolation among the plurality of pixels based on the image information outputted from the first imaging regions or the second imaging regions, and calculates the distance to the object using the information obtained by the interpolation.

6. The camera module according to claim 1, which is mounted on an automobile, and-used for obtaining information on an environment.

7. The camera module according to claim 6, further comprising a driving mechanism for changing a direction of the camera module in accordance with a vehicle speed signal an/or a turning signal of the automobile.

8. The camera module according to claim 1, wherein the plurality of imaging regions are obtained by dividing a single imaging device into a plurality of regions.

9. The camera module according to claim 1, wherein a point light source at infinity is captured, and each origin of the plurality of imaging regions is set based on the image information outputted from the plurality of imaging regions.

10. The camera module according to claim 1, wherein the at least two infrared wavelength selection regions and the at least two visible light wavelength selection regions respectively are placed at positions diagonal to each other.

11. An automobile with the camera module according to claim 1 mounted thereon, wherein the camera module is mounted so that at least two of tim first imaging regions and at least two of the second imaging regions respectively are placed at positions diagonal to each other with respect to a vertical direction of the automobile.

12. The camera module according to claim 1, wherein the plurality of pixels is arranged two-dimensionally in a row ditection and a column direction.

* * * * *